United States Patent [19]

Alves

[11] Patent Number: 5,742,340
[45] Date of Patent: Apr. 21, 1998

[54] AMBIENT LIGHT AUTOMATIC GAIN CONTROL FOR ELECTRONIC IMAGING CAMERAS AND THE LIKE

[75] Inventor: James F. Alves, Tucson, Ariz.

[73] Assignee: Hughes Missile Systems Company, Los Angeles, Calif.

[21] Appl. No.: 471,467

[22] Filed: Jun. 6, 1995

[51] Int. Cl.$^6$ ..................................................... H04N 5/20
[52] U.S. Cl. .......................... 348/255; 348/366; 348/375
[58] Field of Search ....................................... 348/222, 255, 348/256, 366, 373, 375; H04N 5/228, 5/20, 5/238, 5/225

[56] References Cited

U.S. PATENT DOCUMENTS

| | | |
|---|---|---|
| 4,166,678 | 9/1979 | Schrader . |
| 4,471,228 | 9/1984 | Nishizawa . |
| 4,584,598 | 4/1986 | Kutaragi . |
| 4,635,126 | 1/1987 | Kinoshita . |
| 4,814,605 | 3/1989 | Junkermann . |
| 4,989,093 | 1/1991 | Kaneko . |
| 5,010,394 | 4/1991 | Murao . |
| 5,418,567 | 5/1995 | Boers ..................................... 348/375 |

FOREIGN PATENT DOCUMENTS

| | | |
|---|---|---|
| 2749232 | 2/1979 | Germany . |
| 59136722 | 8/1984 | Japan . |
| 1260329 | 10/1989 | Japan . |
| 9211727 | 7/1992 | WIPO . |

*Primary Examiner*—Sherrie Hsia
*Attorney, Agent, or Firm*—Charles D. Brown; Wanda Denson-Low

[57] ABSTRACT

Apparatus that performs automatic gain control (AGC) for an electronic imaging camera, especially in outdoor surveillance applications. A fiber optic link is used to collect ambient light and couple this light onto a small portion of a light sensing array of the camera. A reference voltage produced by the light sensing array in response to the light from the fiber is used by AGC circuits in the camera to control the integration time of light sensing elements of the array, the gain of the camera's video amplifier, and lens aperture, if necessary. These camera gain controls are adjusted to maintain the reference voltage derived from the light provided by the fiber optic link to be within a predefined range as the ambient light level varies due to weather conditions and time of day. Methods of providing automatic gain control correction are also disclosed.

22 Claims, 1 Drawing Sheet

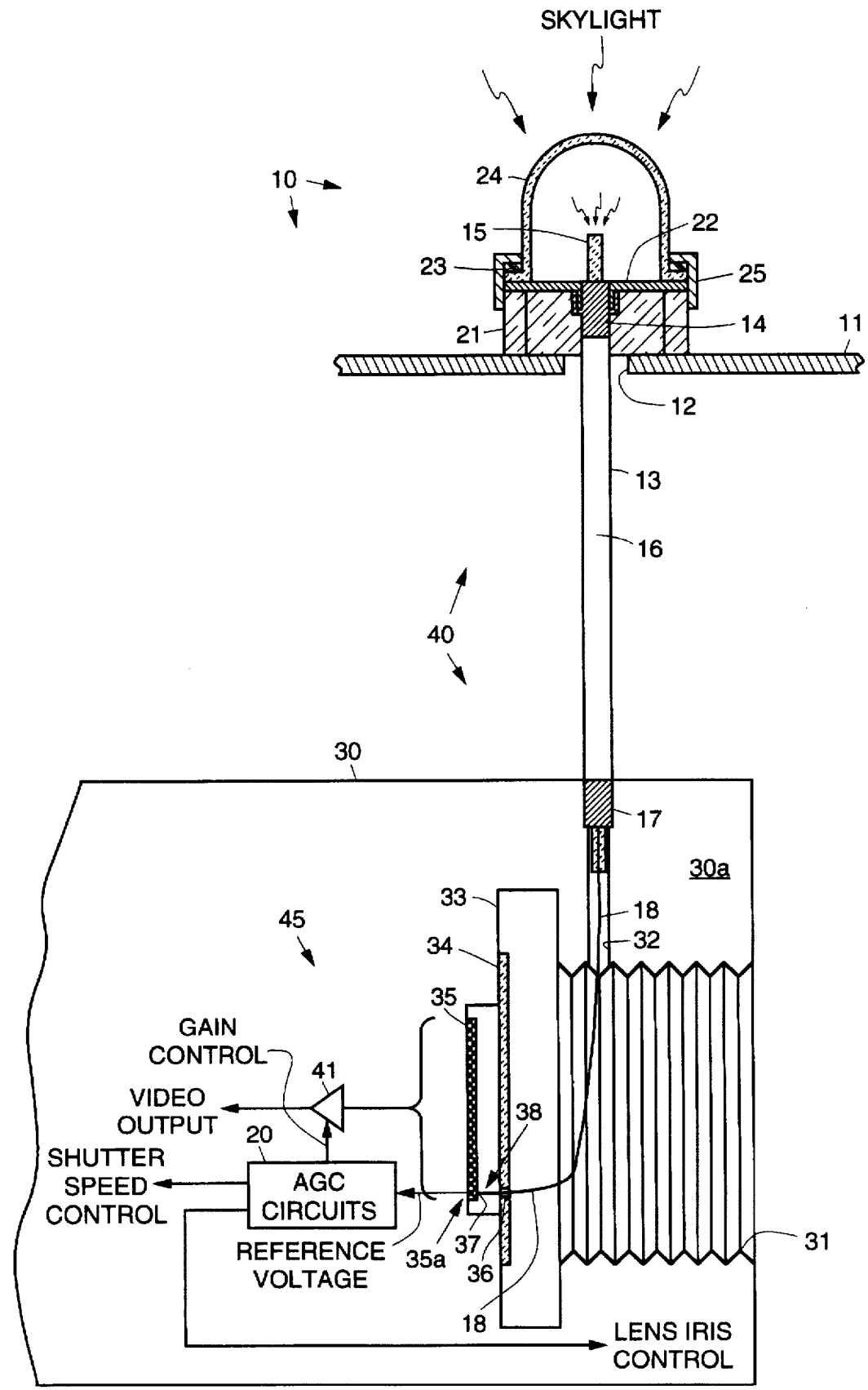

AMBIENT LIGHT AUTOMATIC GAIN CONTROL FOR ELECTRONIC IMAGING CAMERAS AND THE LIKE

BACKGROUND

The present invention relates generally to electronic imaging cameras, and more particularly, to ambient light automatic gain control apparatus and methods for use in such electronic imaging cameras.

The major purpose of gain control circuits used in electronic video imaging cameras is to adjust the amount of light gathered and/or the degree of sensitivity of light-to-electricity producing elements used in the camera, so that the electrical signals generated by the camera, while viewing objects of interest, are widely spread across the available output dynamic range and limited in their degree of saturation or clipping. The changes in gain are required so that, as light levels rise and fall during the course of a day or during variable weather conditions, the image produced by the camera possesses adequate contrast while viewing objects of interest.

Existing automatic gain control (AGC) circuits used in video cameras, such as in home camcorders, for example, assume that the overall background, or a selected portion of a scene viewed by the camera, is a suitable indicator of the overall ambient illumination levels for the objects that are to be imaged. In many cases, this assumption is not true and the AGC circuits therefore adapt the camera gains to an incorrect ambient light level resulting in poor image contrast.

Accordingly, it is an objective of the present invention to provide for ambient light automatic gain control apparatus and methods for use in electronic cameras that overcomes the limitations of conventional automatic gain control circuits.

SUMMARY OF THE INVENTION

To meet the above and other objectives, the present invention provides for apparatus and methods that perform automatic gain control (AGC) for electronic imaging (video) cameras, especially in outdoor surveillance applications. The present invention uses fiber optic technology to collect ambient light and couple this light onto a small portion of a light sensing element of the camera. A reference voltage produced by the light sensing element in response to the light from the fiber is used by AGC circuits in the camera to control the integration time of the sensing elements, the gain of the camera's video amplifier, and lens aperture, if necessary. These camera gain controls are adjusted to maintain the reference voltage derived from the light provided by the fiber optic link 13 to be within a predefined range as the ambient light level varies due to weather conditions and time of day. As the gain controls begin to approach maximum usable settings under dark conditions, lights are turned on to illuminate the area viewed by the camera and the gains are set based on a nighttime AGC technique that is not part of the present invention.

The present invention provides an improved means and method for adapting the gain controls of video cameras, especially those used in outdoor surveillance applications, when viewing rapidly moving objects under dynamically changing ambient lighting conditions. The present invention allows an electronic imaging camera to create high contrast images of desired objects moving through the field-of-view of the camera regardless of the specific background light levels within the field-of-view. The present invention does not add to the electronics required for modern video camera AGC circuits, involves no moving parts, and automatically compensates for inherent changes of the camera in response to light levels as the temperature of the camera varies. Also, the present invention does not require high speed AGC responses when objects move rapidly through the field-of-view of the camera.

With the present invention, the overall ambient light level is directly monitored by a few sensing elements of the camera regardless of what objects are viewed by the camera. A separate light sensor and associated electronics to sense the ambient lighting conditions is avoided by the present invention since a small portion of the existing multi-element imaging sensor of the camera is used as the ambient light sensor. The problems and costs associated with trying to match the response of a separate ambient light sensor to the response of the light sensing elements of the camera over an extremely wide range of outdoor light levels and over temperature variations is also avoided since the same sensor element is used for both imaging and ambient light sensing.

A specific application for which the invention is ideally suited for is a traffic surveillance camera mounted to view a single lane of traffic from overhead. The present invention monitors the overall ambient light level of the sky through a fiber optic assembly and allows the camera to dynamically adapt its gains such that high contrast images of passing vehicles and their license plates may be generated regardless of the ambient lighting conditions or the light levels reflecting off of the road surface.

Common AGC circuits for cameras utilize the light levels input through the lens to set gain levels. Since the camera looks at the road surface in this application, the light reflecting off the road surface is what the camera uses to set the gains. Light levels from the road surface do not always provide a good indication of the ambient illumination conditions for passing vehicles. For example, direct sunlight reflections off of the road surface near sunrise and sunset can reflect high levels of light towards the camera despite relatively low levels of overall ambient illumination. Under these conditions, the conventional AGC approach generates low levels of gain resulting in low contrast images of passing vehicles, especially at high speeds.

Various weather conditions or road surface materials can also affect the light reflecting properties of the road and cause poor gain settings to be chosen by the camera. The present invention ensures that the camera gains are set properly to produce high contrast images of vehicles by adapting the camera gains based on overall ambient skylight levels and not based on unreliable road reflectance properties.

The present invention may be employed in an automatic license plate reader developed by the assignee of the present invention. This invention may also be employed with a transportation management systems that are used on electronic tollways. The present invention may be employed in a remote emissions sensor manufactured by the assignee of the present invention. The present invention may also be used to improve AGC circuits for video imaging sensors utilized in missile seekers manufactured by the assignee of the present invention.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole drawing FIGURE is a cross sectional side view of ambient light automatic gain control apparatus in accordance with the present invention for use in such electronic imaging cameras.

DETAILED DESCRIPTION

Referring to the drawing FIGURES, it illustrates a cross sectional side view of ambient light automatic gain control apparatus 10 in accordance with the present invention for use in an electronic (video) imaging camera 30. The apparatus 10 is used to control automatic gain control (AGC) circuits 20 of the camera 30. The apparatus 10 comprised of two parts: an optical portion 40 that collects light from the sky, and couples it to a light sensing array 35 of the camera 30 using a fiber optic link 13, and an electronics portion 45 that utilizes the automatic gain control circuits 20 in the camera 30.

The optical portion 40 of the apparatus 10 is generally illustrated in the top portion of the drawing FIGURE. The optical portion 40 of the apparatus 10 comprises a smooth glass hemispherical dome 24 that is secured to a metal base plate 22 having a threaded flange by means of a metal ring collar 25 and robber gasket 23. The metal ring collar 25 also connects to a plastic stand-off tube 21 that is secured to a body 30a of the camera 30 or to the environmental housing 11. The metal base plate 22 has a central hole that is threaded on its exterior surface and accepts a fiber optic SMA connector 13 that passes through an opening 12 disposed in the environmental housing 11 or in the camera 30 (not shown) if the environmental housing 11 is not used.

The fiber optic link 13 is comprised the fiber optic SMA connector 13 disposed at one end, a length of optical fiber 18 having a protective jacket 16 thereover, and a metallized end 17 disposed at the opposite end of protective jacket 16. The optical fiber 18 is coated with black glass to minimize light reflections. The optical fiber 18 extends from the metallized end 17. The optical fiber 18 is polished at its end adjacent to the SMA connector 14 and sits flush with the end of the metal tip 15.

The camera 30 is comprised of a body 30a having a threaded mounting hole 31 or lens mount 31. The metallized end 17 of the fiber optic link 13 is disposed in an opening 32 in the body 30a of the camera to provide strain relief for the optical fiber 18. A cavity 33 is disposed adjacent an internal end of the threaded mounting hole 31. A protective glass window 34 is disposed at the back end of the cavity distal from the threaded mounting hole 31. The protective glass window 34 has an opening 36 therethrough through which the optical fiber 18 passes. A CCD array 35 or other light sensing means 35 is disposed adjacent to the protective glass window 34. The optical fiber 18 is polished at its end and is bonded or otherwise secured using optical cement 37, for example, to the surface of the CCD array 35 so that it illuminates a predetermined number of elements 35a of the CCD array 35.

In operation, skylight enters the optical portion 40 of the apparatus 10 through the smooth glass hemispherical dome 24, which located outside of the camera 30 or outside an environmental housing 11 of the camera 30 if it is used. The dome 24 is mounted above the camera 30 and is generally oriented level with the horizon even if the camera 30 and housing 11 are tilted. The apparatus 10 performs best if the dome 24 is positioned higher then and away from all nearby objects that can cast deep shadows onto it or prevent it from viewing the entire sky.

Diffuse glass is used for the dome 24 so that direct sunlight is not inadvertently coupled directly into the optical fiber 18 resulting in an artificially high measurement of overall ambient skylight. Glass is used for both the dome 24 and optical fiber 18 instead of plastic because glass maintains a more constant transmissivity over repeated exposure to weather and ultraviolet rays and passes wavelengths of light in approximately the same proportions as most camera lenses.

The size of the dome 24 is chosen to be small enough so as not to be an inviting perch for birds or other small animals yet large enough so that a random bird dropping, dirt or snow particles, or spider webs, do not significantly affect the light gathering function of the dome 24. The polished end of a optical fiber 18 is located inside the dome 24 and points directly towards the apex of the dome 24 along its axis of symmetry. The end of the optical fiber 18 is positioned far enough away from the apex of the dome 24 to ensure that the fiber will collect light over the entire hemisphere of the dome 24. Optical fibers 18 with high numerical apertures (NA 20.9) are used.

The open end of the dome 24 and the end of the optical fiber 18 are protected from the environment by the metal base 22, ring gasket 23, and metal collar 25 that attach to the hard plastic stand-off tube 21. The metal SMA connector 14 is used at the end of the optical fiber 18 to allow it to be easily attached and detached to and from the metal base 22 of the dome 24. A thermostatically controlled heating resistor (not shown) may be attached to the metal base 22 to conduct heat to the end of the optical fiber 18 and the dome 24 to prevent condensation or ice from forming on the end of the optical fiber 18 and inside the dome 24 during low temperature and high humidity conditions. The optical fiber 18 is jacketed with a protective jacket 16 made of pliable material to protect it during assembly and disassembly and camera maintenance procedures. The jacket material is not electrically conductive and nor is the stand-off tube 21 to avoid attracting lighting.

The other end of the optical fiber 18 is bare and is physically attached to one of the corners of the CCD array 35 using conventional techniques developed to bond fiber optic reducers to CCD arrays in the medical industry. The optical fiber 18 is coated with black glass to minimize internal reflections of light from the camera lens inside the camera 30 and also to minimize the scattering of light from outer edge of the optical fiber 18 onto CCD elements not meant to receive light from the optical fiber 18. The optical fiber 18 passes through the small hole or opening 36 in the protective glass window 34 for the CCD array 35 then bends upward to exit the camera 30 through the opening 32 adjacent a top edge of the lens mount 31. As the optical fiber 18 leaves the surface of the CCD array 35, it is positioned to avoid interference or shadowing of the light entering the camera 30 through the lens. The hole 32 in the lens mount 31 where the optical fiber 18 exits the camera 30 is placed sufficiently far back in the lens mount 31 so lenses will not touch the optical fiber 18 when they are attached to the camera 30 but not so close to the CCD array 35 that a very sharp bend in the optical fiber 18 is required. The optical fiber 18 leaves the camera 30 through the metal tip 17 that is embedded in the lens mount 31 and hole 32 to provide strain relief for the jacketed portion of the optical fiber 18 outside the camera 30.

The length (loss) of the optical fiber 18 and the transmissivity of the dome 24 are selected so that the amplitude of the skylight coupled onto the CCD array 35 is comparable to the average light intensity of the objects of interest when viewed through the lens. The length of the jacketed section of the fiber optic link 13 is also chosen to allow some slack so that the fiber optic link 13 can be easily disconnected from the dome 24 during assembly and camera maintenance procedures.

The AGC control circuitry 20 uses the skylight level on the CCD array 35 provided by the optical fiber 18 to always be ready to form high contrast images of objects of interest regardless of what the lens may view at the moment. The electronics portion of the apparatus that accomplishes this task is described in the following paragraphs.

In a typical video camera 30, AGC is implemented using either of two basic techniques. The first uses some portion (or all) of the CCD array 35 as a reference area. Light is focused onto the reference area by the lens and the average voltage produced by the reference area over time is used as a reference signal which is input into feedback control circuits to adapt the lens aperture, camera shutter speed, and/or gain of a video amplifier to maintain the reference output voltage at a fixed constant level as light levels input through the lens vary. The second approach senses the peak video level wherever it may occur on the CCD array 35 and uses the same feedback circuits used in the first method to maintain this peak level at a fixed constant level as input light levels vary.

These traditional AGC approaches do not produce adequate imaging results for automatic license plate reading applications where resolution requirements restrict the field-of-view of the camera 30 to approximately one traffic lane and high traffic speeds result in vehicles passing through the field-of-view in only a few frame times. Under these conditions, traditional AGC controls cannot react fast enough to the rapid appearance of a vehicle in the field-of-view and the light illuminating the reference area or the peak level over the CCD array 35 prior to (and during) the arrival of the vehicle is often a poor indicator of the light that will reflect off of a license plate.

The apparatus 10 of the present invention solves these problems by coupling light by way of the optical fiber 18 from the entire sky onto a small reference area (comprising a plurality of elements 35a) at one corner of the CCD array 35. The reference light level is therefore a direct indicator of the ambient light level illuminating license plates or other objects of interest. During daylight hours, the largest instantaneous dynamic range over which the camera 30 must image license plates is given by a white plate in direct sun versus a dark colored plate in shadow. Most modern video cameras barely provide this dynamic range at an appropriate gain and level setting. The amount of light collected and coupled to the reference area 38 by the optical fiber 18 is designed as needed to generate a light level within this dynamic range.

The ambient light level (Lux) versus reference voltage level necessary to keep the reference voltage constant is shown in Table 1

TABLE 1

| Ambient Light Level (LUX) | Reference Voltage (IRE) | Ambient Light Level (LUX) | Reference Voltage (IRE) |
| --- | --- | --- | --- |
| 436 | 84.1 | 709 | 83.5 |
| 450 | 84.5 | 724 | 83.5 |
| 480 | 85.2 | 680 | 83.5 |
| 491 | 85.2 | 699 | 83.5 |
| 500 | 85.2 | 709 | 83.5 |
| 540 | 85.2 | 724 | 83.5 |
| 565 | 85.2 | 742 | 83.5 |
| 575 | 86.4 | 748 | 83.5 |

TABLE 1-continued

| Ambient Light Level (LUX) | Reference Voltage (IRE) | Ambient Light Level (LUX) | Reference Voltage (IRE) |
| --- | --- | --- | --- |
| 582 | 86.4 | 736 | 84.9 |
| 590 | 86.4 | 723 | 84.6 |
| 600 | 86.4 | 745 | 84.6 |
| 611 | 86.4 | 610 | 84.0 |
| 668 | 87.6 | 658 | 84.9 |
| 680 | 83.5 | 546 | 84.9 |
| 699 | 83.5 | | |

The AGC circuits 20 maintain the output voltage of the reference area 38 to the chosen level as ambient lighting conditions change over time by adjusting the integration time of the CCD array 35 and gain of its video amplifier 41. If it is not possible to maintain the reference voltage at the chosen level for a particular lens aperture setting, a new and known aperture setting is chosen using a motorized iris and a compensating change is made to the chosen reference level that the AGC circuits 20 are attempting to maintain.

In this manner the gain settings of the camera 30 are dynamically adjusted to produce a high quality image of the license plates or other object of interest regardless of what the camera 30 images at any given moment. Since average skylight levels do not change rapidly with time relative to video frame rates, the standard AGC response times are more than adequate to track the reference light level changes and therefore the high costs associated with high speed AGC controls are avoided. As night approaches, maximum camera gains cannot prevent the reference signal level from falling. As the reference level falls below a critical threshold, external lighting is required to maintain adequate imaging of the license plates. The camera 30 can then switch to a more traditional AGC approach during fixed illumination conditions provided by artificial lighting. As the reference level rises above a critical threshold during sunrise, the camera 30 is switched to use the present automatic gain control apparatus 30.

The present invention also envisions a method of automatically controlling the gain of an electronic imaging camera 30 having a multi-element light sensing array 35 and a video amplifier 41. The method comprises the following steps. Light from the sky is collected. The collected light is coupled to the predetermined plurality of light sensing elements 35a of the light sensing array 35. A reference voltage is produced in response to the light coupled to the predetermined plurality of light sensing elements 35a. The gain of the video amplifier 41 is then adjusted in response to and as a function of the reference voltage. In addition to adjusting the gain of the video amplifier 41 in response to the reference voltage, the integration time of all light sensing elements of the array 35 may be adjusted as a function of the reference voltage, the shutter speed of the shutter of the camera 30 may be adjusted as a function of the reference voltage, and the shutter speed of the shutter of the camera 30 may be adjusted as a function of the reference voltage.

Thus, ambient light automatic gain control apparatus and methods for use in electronic imaging cameras has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Ambient light automatic gain control apparatus for use with an electronic imaging camera having a multi-element light sensing array and a video amplifier for amplifying signals produced by the array, said apparatus comprising:
a fiber optic link that collects light from the sky, and couples the light to a predetermined plurality of light sensing elements of the light sensing array that produce a reference voltage in response thereto; and
automatic gain control circuits coupled to the light sensing array for controlling the gain of the video amplifier of the camera as a function of the reference voltage produced by the predetermined plurality of light sensing elements.

2. The apparatus of claim 1 wherein the fiber optic link comprises:
a light-diffusing dome; and
an optical fiber having one end disposed within the dome for receiving the light transmitted by the dome, said optical fiber having an opposite end secured to the light sensing array adjacent to the predetermined plurality of light sensing elements.

3. The apparatus of claim 2 wherein the fiber optic link further comprises:
a base plate having a threaded flange;
a ring collar for securing the dome to the base plate; and
a gasket disposed between the dome and the base plate.

4. The apparatus of claim 3 further comprising a stand-off tube disposed between the base plate and the camera.

5. The apparatus of claim 3 wherein the base plate has a central hole through which the optical fiber passes.

6. The apparatus of claim 5 wherein a fiber optic SMA connector is coupled to the central hole for securing the optical fiber with respect to the dome.

7. The apparatus of claim 1 wherein the fiber optic link is comprised a fiber optic SMA connector disposed at one end, a length of optical fiber having a protective jacket thereover, and a metallized end disposed at the opposite end of the protective jacket.

8. The apparatus of claim 2 wherein the optical fiber is coated with black glass to minimize light reflection.

9. The apparatus of claim 6 wherein the optical fiber is polished at an end adjacent to the SMA connector.

10. The apparatus of claim 7 wherein the camera comprises:
a body, and wherein the metallized end of the fiber optic link is disposed in an opening in the body to provide strain relief for the optical fiber;
a cavity disposed in the body; and
a protective window disposed adjacent the cavity that has an opening therethrough through which the optical fiber passes.

11. The apparatus of claim 2 wherein the optical fiber is polished at an end adjacent to the predetermined plurality of light sensing elements.

12. The apparatus of claim 1 wherein the automatic gain control circuits provides a shutter speed control output signal for controlling the integration time of the light sensing elements of the light sensing array.

13. The apparatus of claim 1 wherein the automatic gain control circuits provides a lens iris output signal for controlling the lens iris setting of the camera.

14. Ambient light automatic gain control apparatus for use with an electronic imaging camera having a multi-element light sensing array and a video amplifier for amplifying signals produced by the array, said apparatus comprising:
a fiber optic link that collects light from the sky, and couples the light to a predetermined plurality of light sensing elements of the light sensing array that produce a reference voltage in response thereto; and
automatic gain control circuits coupled to the light sensing array for controlling the integration time of all light sensing elements thereof and gain of the video amplifier of the camera as a function of the reference voltage produced by the predetermined plurality of light sensing elements.

15. The apparatus of claim 14 wherein the fiber optic link comprises:
a light-diffusing dome; and
an optical fiber having one end disposed within the dome for receiving the light transmitted by the dome, said optical fiber having an opposite end secured to the light sensing array adjacent to the predetermined plurality of light sensing elements.

16. A method of automatically controlling the gain of an electronic imaging camera having a multi-element light sensing array and a video amplifier for amplifying signals produced by the array, said method comprising the steps of:
collecting light from the sky;
coupling the collected light to a predetermined plurality of light sensing elements of the light sensing array;
producing a reference voltage in response to the light coupled to the predetermined plurality of light sensing elements; and
adjusting the gain of the video amplifier of the electronic imaging camera in response to and as a function of the reference voltage.

17. The method of claim 16 further comprising the step of adjusting the integration time of all light sensing elements of the array as a function of the reference voltage produced by the predetermined plurality of light sensing elements.

18. The method of claim 16 further comprising the step of adjusting the shutter speed of the shutter of the camera as a function of the reference voltage produced by the predetermined plurality of light sensing elements.

19. The method of claim 16 wherein the step of collecting light from the sky comprises the step of collecting light from the sky using a fiber optic link.

20. A method of automatically controlling the gain of an electronic imaging camera having a multi-element light sensing array and a video amplifier for amplifying signals produced by the array, said method comprising the steps of:
collecting light from the sky;
coupling the collected light to a predetermined plurality of light sensing elements of the light sensing array;
producing a reference voltage in response to the light coupled to the predetermined plurality of light sensing elements;
adjusting the gain of the video amplifier of the electronic imaging camera in response to and as a function of the reference voltage; and
adjusting the integration time of all light sensing elements of the array as a function of the reference voltage produced by the predetermined plurality of light sensing elements.

21. The method of claim 20 further comprising the step of adjusting the shutter speed of the shutter of the camera as a function of the reference voltage produced by the predetermined plurality of light sensing elements.

22. The method of claim 21 wherein the step of collecting light from the sky comprises the step of collecting light from the sky using a fiber optic link.

* * * * *